United States Patent [19]
Smith

[11] 3,720,417
[45] March 13, 1973

[54] QUICK CHANGE SPINDLE ADAPTER OR CHUCK

[76] Inventor: Theodore M. Smith, 14750 Puritan, Detroit, Mich. 48227

[22] Filed: July 19, 1971

[21] Appl. No.: 163,946

[52] U.S. Cl. .................................279/82, 279/1 B
[51] Int. Cl. ..............................................B23b 31/04
[58] Field of Search ...............279/82, 1 B, 83, 79, 75

[56] References Cited

UNITED STATES PATENTS 3,473,815 10/1969 Bilz .........................................279/82
3,672,692 6/1972 Fauth ......................................279/82

Primary Examiner—Andrew R. Juhasz
Assistant Examiner—Z. R. Bilinsky
Attorney—Daniel G. Cullen et al.

[57] ABSTRACT

A quick holding chuck, generally according to the device shown in FIGS. 4 and 5 of the U.S. Patent to Bilz No. 3,473,815 of Oct. 21, 1969, but improved in the provision of a spring holding plate between an enlarged head of the side set screw and the chuck shank.

1 Claim, 5 Drawing Figures

PATENTED MAR 13 1973   3,720,417
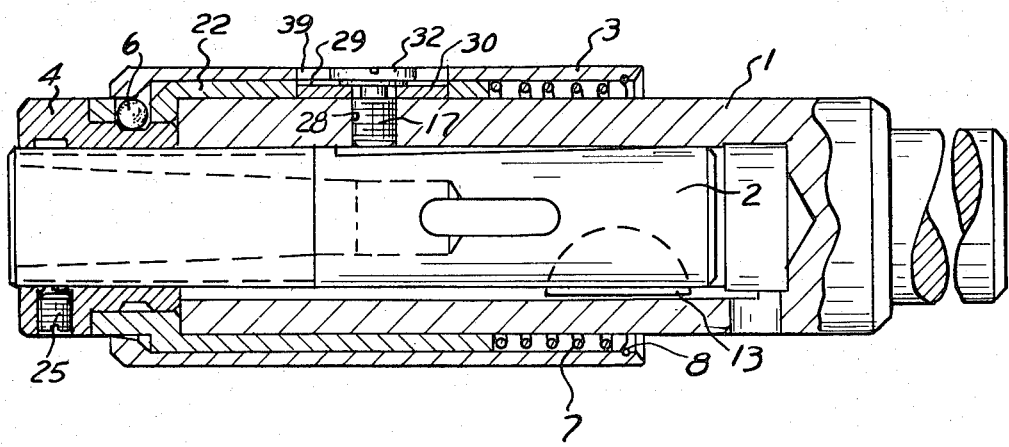
FIG. 1
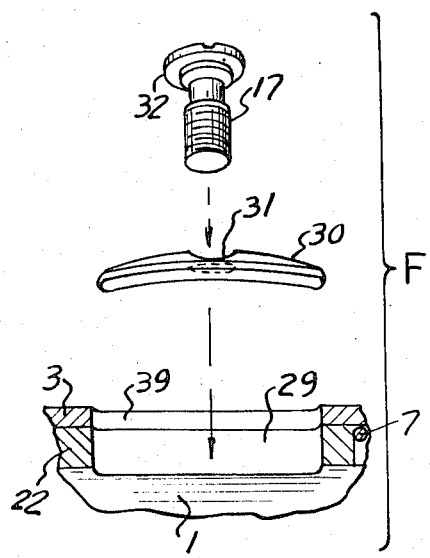
FIG. 2
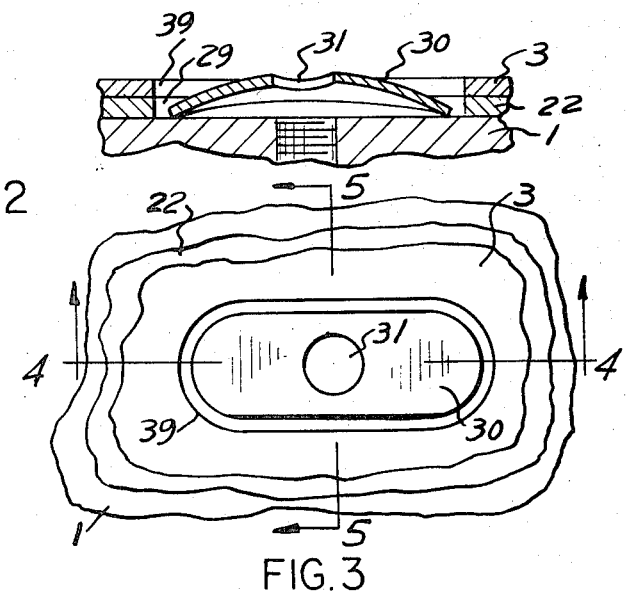
FIG. 4
FIG. 3
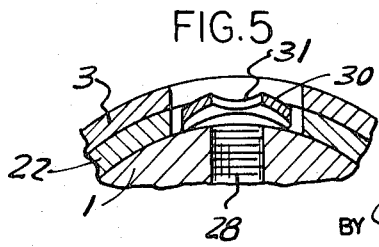
FIG. 5
INVENTOR
THEODORE M. SMITH
BY Cullen, Settle, Sloman & Cantor
ATTORNEYS

QUICK CHANGE SPINDLE ADAPTER OR CHUCK

BACKGROUND

U.S. Pat. No. 3,473,815 shows a quick change chuck wherein a set screw 17 locks a locking sleeve 22 to a tubular chuck shank 1, with the screw passing through aligned clear holes 18 and 19 of a control shell 3 and the sleeve 22, and threading into a tapped hole of the shank 1. The head of the screw is exposed through hole 18 in an outer control shell 3. The screw fits snugly in hole 19 of sleeve 22 and thus anchors the sleeve 22 against relative longitudinal movement with respect to the chuck shank 1. To effect such anchoring, it is required that the hole 19 in the sleeve 22 be located extremely accurately with respect to the threaded hole in the shank 1 which receives the screw 17 for accurate registry and alignment of the parts.

In U.S. Pat. No. 3,473,815, the locking action provided by the screw is spread over an extremely small area. Consequently, screws in use often became loose and became disconnected, causing a malfunction or damage to the parts or the entire assembly. Often times the set screws would become loose and lost. Often times there existed play between the shank and the tool within it and under the thus created strenuous torque conditions, the locking screws were placed under great stress, increasing the difficulties arising from the use of set screws for locking.

THE INVENTION

The present invention employs, in addition to a retaining or locking screw, an elongated and enlarged spring bearing or retaining plate, formed to be arcuate in cross section longitudinally as well as transversely. Such retaining plate is adapted to engage the outside surface of the shank for frictionally gripping the shank throughout the entire perimeter of the retainer plate and thus enhance the anchoring action provided by the set screw.

In addition, the retainer plate fills the enlarged hole in the locking sleeve so that the plate edge holds such sleeve locked in position relative to the shank.

THE DRAWING

A preferred embodiment of the invention is shown in the appended drawing. In this drawings:

FIG. 1 is a longitudinal cross sectional view of the parts in assembly.

FIG. 2 is a transverse fragmentary exploded view with parts partly in section.

FIG. 3 is a fragmentary plan view.

FIG. 4 is a section as if on line 4—4 of FIG. 3.

FIG. 5 is a section as if on line 5—5 of FIG. 3.

DETAILED DESCRIPTION

It will be understood at the outset that most of the parts shown in the drawing hereof are the same in structure and function as the corresponding parts of FIGS. 4 and 5 of the Bilz U.S. Pat. No. 3,473,815 and accordingly, except for a brief reference to these old parts, attention will be directed immediately to the novel features of the present invention.

Hence, it may be stated at the outset, that the device is a quick change chuck and comprises a cylindrical hollow shank 1 having a tubular wall, splined at 13, receiving a tool receiving socket 2 axially slidable within the shank and adapted to receive a tool. At the open end of the socket 2 is a holding nut 4. A locking sleeve 22 controls ball grip 6 for the nut 4, threaded onto tool holding socket 2. Nut 4 is locked to socket 2 by set screw 25.

Outside sleeve 22, stressed by spring 7, held by stop ring 8, is a slidable control shell 3, which normally retains balls 6 in nut locking position and is manipulated for unlocking the nut and connected socket.

A radial set screw 17 threads through clear holes 29–39 of the locking sleeve 22 and shell 3 and into a tapped hole 28 of the shank 1 for locking the sleeve 22 and the shank 1 relatively. The head of the screw is accessible through the hole 39 in the manual control shell 3.

The improvements hereof are as follows: the screw 17 has its head 32 enlarged; the holes 29 and 39 are considerably larger in area than the enlarged head 32 of the screw 17; an oval, centrally apertured, large spring plate or retainer plate 30 is placed between the enlarged head 32 of the screw 17 and the shank 1 and bears around its perimeter against the shank; the plate 30 is normally arcuate in cross section when viewed transversely as well as longitudinally.

When the screw 17 is threaded down snugly through the retainer plate 30 and into the shank 1, the retainer plate is flattened and helps anchor the parts against accidental dislodgment.

Plate 30 also provides a larger surface area of bearing namely, the perimeter of the plate 30 bearing against the wall of hole 29 of sleeve 22. When the plate 30 is so flattened, head 32 of screw 17 is within slot or hole 39 of shell 3, as shown in FIG. 1, to permit reciprocation of the shell 3.

With this construction there can be tolerated inaccuracies of alignment of the axes of the tapped hole 28, and the holes 29 and 39 of the parts, and great accuracy of spacing of the various parts is no longer required.

Now having described the chuck herein disclosed, reference should be had to the claim which follows.

I claim:

1. In a quick change chuck of a known type, comprising a cylindrical hollow shank having a tubular wall; a tool receiving socket axially slidable within said shank and adapted to receive a tool; a holding nut for and at the open end of said socket and locked to the socket; a locking sleeve; a ball grip at the nut and the open end of the locking sleeve; a spring biased slidable control shell outside the locking sleeve; a radial set screw locking the locking sleeve and the shank relatively and threading into the shank through aligned holes in the locking sleeve and the control shell for providing access to the head of the set screw;

the improvement which comprises said screw having its head enlarged; said holes being considerably larger in area than the enlarged head of the screw, and a centrally apertured spring plate between the enlarged head of the screw and the shank and bearing against the shank; said plate, when compressed by threading the screw home, filling the opening of the locking sleeve to block it against movement relative to the shank, and holding the screw firmly in home position; and locating and holding the screw head within the enlarged opening of the control shell, which opening is enough larger than the screw head to permit the necessary reciprocation of said shell, without interference from the screw head.

* * * * *